United States Patent [19]

May

[11] 4,253,283
[45] Mar. 3, 1981

[54] EXTENSIBLE TRAILER SECTION ROOM

[76] Inventor: John C. May, Rt. 1, Box 27, Concordia, Mo. 64020

[21] Appl. No.: 53,432

[22] Filed: Jun. 29, 1979

[51] Int. Cl.³ ............................................. E04B 1/346
[52] U.S. Cl. ..................................................... 52/67
[58] Field of Search ..................... 52/67, 64; 296/171, 296/175

[56] References Cited

U.S. PATENT DOCUMENTS

| | | | |
|---|---|---|---|
| 2,225,319 | 12/1940 | Rollo | 296/171 |
| 2,877,509 | 3/1959 | Klibanow | 52/67 |
| 2,965,412 | 12/1960 | Henderson et al. | 52/67 X |
| 3,181,910 | 5/1965 | Thomas | 52/67 |
| 3,512,315 | 5/1970 | Vitaltni | 52/67 |
| 4,128,269 | 12/1978 | Stewart | 52/67 X |

Primary Examiner—Price C. Faw, Jr.
Assistant Examiner—Carl D. Friedman
Attorney, Agent, or Firm—Webster B. Harpman

[57] ABSTRACT

An extensible room for travel trailers having a floor, walls, and roof section is arranged for sideward movement into and out of an opening in one of the trailer walls, the extensible room is suspended from overhead telescopic supporting frames and a drive assembly for moving the extensible room is provided.

3 Claims, 3 Drawing Figures

EXTENSIBLE TRAILER SECTION ROOM

BACKGROUND OF THE INVENTION (1) Field of the Invention:

This invention relates to travel trailers of the type towed by a car or truck and having extensible rooms.

(2) Description of the Prior Art:

Prior trailers have used a variety of expanding rooms or sections. See for example U.S. Pat. No. 2,877,509 and U.S. Pat. No. 3,181,910.

In U.S. Pat. No. 2,877,509 an extensible trailer section is disclosed having movable side walls containing a pair of cantilevers which extend as the side walls move to support the room extension on the main body of the trailer.

Applicant's device has a movable room extension supported by overhead telescopically extensible support frames from which the room extension hangs. A self-contained drive assembly extends and retracts the room with respect to the trailer.

In U.S. Pat. No. 3,181,910 a platform for extensible rooms is disclosed consisting of a support structure which is positioned so that a room section can be rolled out and positioned to provide a flat floor transition between the main trailer and the room extension.

Applicant's trailer has a totally self-supporting extensible room driven by an overhead motor and threaded shaft assembly which allows the room to be extended or retracted without the need for secondary support means under the room extension.

SUMMARY OF THE INVENTION

An extensible trailer room comprises walls, a floor, and a roof supported by overhead telescopically extensible frame members which move the extensible room into and out of the main trailer body. The overhead extensible frames comprise a pair of hollow elongated body members telescopically engaged. A motor driven threaded shaft is mounted on one of the hollow elongated body members, the shaft being threadably engaged in a fixed nut on the other of the hollow elongated body members.

DESCRIPTION OF THE PREFERRED EMBODIMENT

Figure 1:
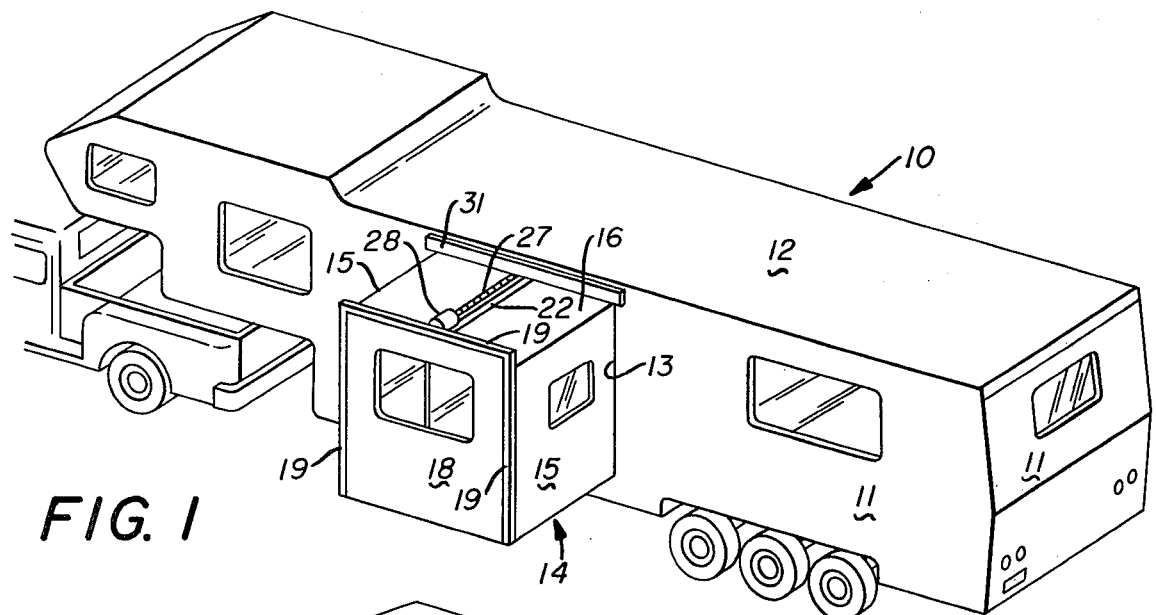
FIG. 1 is a perspective view of a travel trailer with the extensible room in extended position.
Figure 2:
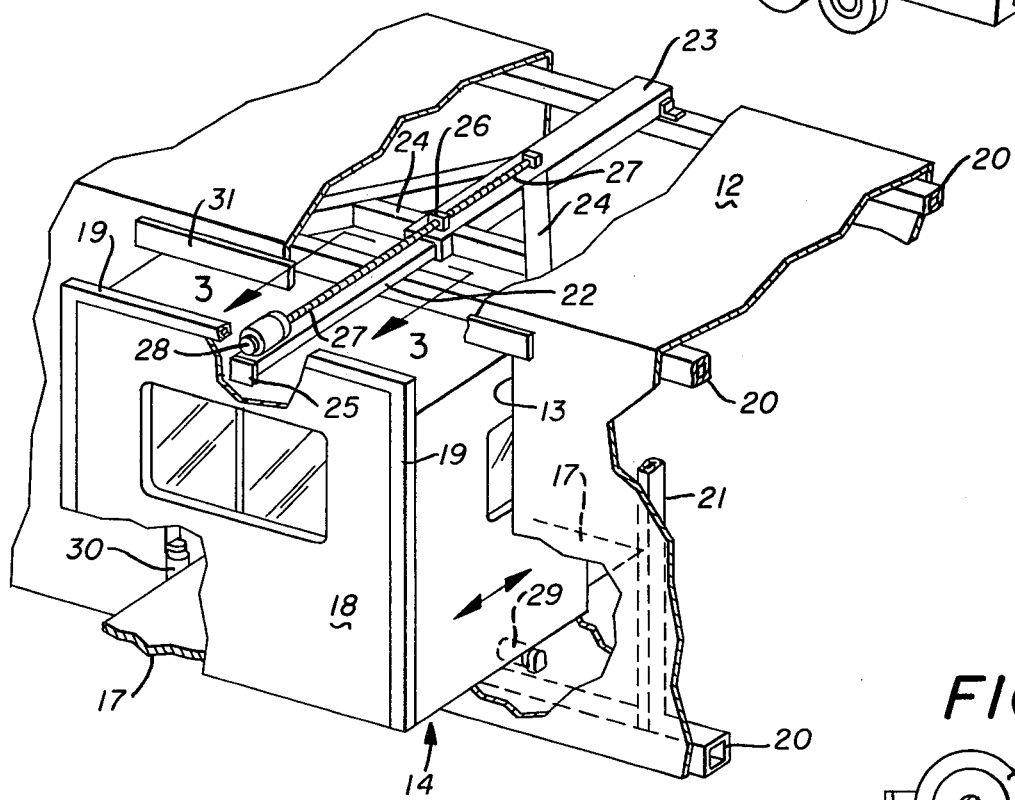
FIG. 2 is an enlarged cutaway view of the support and drive mechanism of the device.

In the form of the invention chosen for illustration and as seen in FIGS. 1 and 2, a travel trailer 10 having a floor, side and end walls 11 and a roof 12 has an opening 13 in a side wall 11 in which a room extension 14 is positioned for movement into and out of the trailer. The room extension 14 has a pair of sidewalls 15, a roof portion 16, a floor 17 and an end support wall 18. Said end support wall 18 has a frame 19 secured to the edges thereof.

By referring now to FIG. 2 of the drawings, it will be seen that the travel trailer 10 has a metal frame formed of longitudinally extending box frame members 20 spaced vertically by a plurality of vertical box frame members 21. An elongated transversely positioned telescopically arranged support frame having members 22 and 23 is located on the upper box frame members 20 and angularly positioned brace frames 24 extend between the support frame member 23 and the box frame members 20. The outer end of the telescopic frame member 22 is attached by a bracket 25 to the frame 19 on the end wall 18 of the extensible room 14.

In order that the extensible room 14 may be moved into and out of the opening 13 in the travel trailer 10, a nut 26 is fixed to the telescopic frame member 23 and a threaded shaft 27 is engaged therein. The shaft 27 is positioned in parallel relation to the telescopic support frames 22 and 23 and has one end coupled to a gear box and motor 28 mounted on the telescopic frame member 22 and adjacent one end thereof. A stop member is located on the other end of the threaded shaft 27. The telescopic frame member 23, the brace frames 24 and the box frames 20 of the trailer 10 thus form a fixed support frame for the room extension 14 which is movably suspended therefrom by the frame 19 and the telescopic frame member 23. The end wall 18 and the side walls 15 of the room extension 14 are supported by the frame 19 and the floor 17 is attached to the walls 15 and 18.

In order that the room extension 14 will move into and out of the trailer 10 without undue friction, rollers 29 and 30 are positioned partially in recesses in the wall 11 and the floor of the trailer defining the opening 13 and engage the floor 17 of the room extension 14 from below and at its sides. The rollers 29 also help support the room extension 14.

Figure 3:
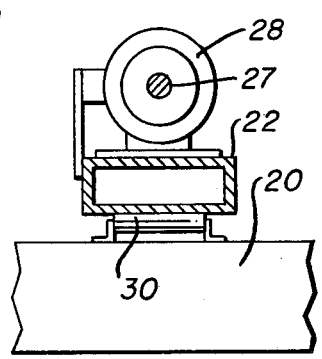
FIG. 3 is an enlarged cross section of the support and drive assembly on line 3—3 of FIG. 2.

In FIG. 3 of the drawings, a third roller 31 is shown mounted on the box frame 20 above the opening 13 where it supports the telescopic frame member 22 as it moves thereover.

Again referring to FIGS. 1 and 2 of the drawings, it will be seen that a weather closure 32 is positioned across the top of the opening 13 for engagement with the frame 19 and the upper portion of the end wall 18 of the room extension 14.

In use the gear box and motor 28 are activated by connection to a power source, not shown, to revolve the threaded shaft 27, which by engagement with the nut 26 will move the telescopic frame member 22 in the telescopic frame member 23. The room extension 14 is thus moved into or out of the travel trailer sidewall 11 where it closes the opening 13 in either retracted or extended position.

It will thus be seen that an extensible room for a travel trailer has been disclosed which can be easily and quickly extended to increase the available living space within the travel trailer and that the room extension is fully supported on the travel trailer requiring no additional support structure.

Although but one embodiment of the present invention has been illustrated and described, it will be apparent to those skilled in the art that various changes and modifications may be made therein without departing from the spirit of the invention and having thus described my invention what I claim is:

1. The combination of a travel trailer and an extension room therefor and means movably positioning said extension room in said travel trailer, said travel trailer having a main frame, a floor, walls and a roof secured thereto, said main frame consisting of horizontally disposed vertically spaced upper and lower box frame members positioned longitudinally of said travel trailer and vertical box frame members positioned between said horizontally disposed upper and lower box frame members, said extension room having a secondary floor, walls and roof being movable disposed in an opening in a wall of said travel trailer, an end wall support frame secured to said extension room, a support frame positioned on said upper box frame members of said main frame of said travel trailer adjacent said roof thereof, said support frame consisting of an elongated traversely positioned frame member, angularly positioned brace frame members extending between said elongated frame member and one of said upper box frame members, and a second support frame telescopically engaged in said first support frame and movable relative thereto, said end wall support frame of said extension room attached to said second support frame and suspended therefrom, and a mechanical device for imparting longitudinal movement whereby said extension room may be moved relative to said travel trailer while suspended from said second support frame.

2. The combination of claim 1 and wherein said first and second support frames are hollow elongated body members of rectangular cross section telescopically engaging one another.

3. The combination set forth in claim 1 wherein said elongated transversely positioned frame member and angularly positioned brace frame members extending therefrom form a Y-shape with one of the elongated transversely positioned frame members being secured to one of said upper box frame members and the other end thereof secured to the angularly positioned brace frame members, and said angularly positioned brace frame members secured to the other one of said upper box frame members.

* * * * *